US012618951B2

(12) United States Patent
Horino et al.

(10) Patent No.: US 12,618,951 B2
(45) Date of Patent: \*May 5, 2026

(54) LIGHT DETECTION DEVICE, LIGHT DETECTION METHOD AND OPTICAL DISTANCE SENSOR

(71) Applicant: OMRON Corporation, Kyoto (JP)

(72) Inventors: Masanobu Horino, Kyotanabe (JP); Yuki Matsui, Kyoto (JP); Ken Nakamuro, Kyoto (JP); Sayuki Nakada, Nara (JP)

(73) Assignee: OMRON CORPORATION, Kyoto (JP)

( \* ) Notice: Subject to any disclaimer, the term of this patent is extended or adjusted under 35 U.S.C. 154(b) by 1121 days.

This patent is subject to a terminal disclaimer.

(21) Appl. No.: 16/979,576

(22) PCT Filed: Mar. 8, 2019

(86) PCT No.: PCT/JP2019/009225
§ 371 (c)(1),
(2) Date: Sep. 10, 2020

(87) PCT Pub. No.: WO2019/176751
PCT Pub. Date: Sep. 19, 2019

(65) Prior Publication Data
US 2021/0011140 A1      Jan. 14, 2021

(30) Foreign Application Priority Data
Mar. 15, 2018      (JP) ................................ 2018-048001

(51) Int. Cl.
| | |
|---|---|
| *G01S 7/4865* | (2020.01) |
| *G01S 7/481* | (2006.01) |
| *G01S 17/10* | (2020.01) |

(52) U.S. Cl.
CPC .......... *G01S 7/4865* (2013.01); *G01S 7/4816* (2013.01); *G01S 17/10* (2013.01)

(58) Field of Classification Search
None
See application file for complete search history.

(56) References Cited

U.S. PATENT DOCUMENTS

| | | | |
|---|---|---|---|
| 6,218,982 B1 | 4/2001 | Shirai et al. | |
| 2008/0158042 A1 | 7/2008 | Ishio et al. | |

(Continued)

FOREIGN PATENT DOCUMENTS

| | | |
|---|---|---|
| CN | 104584434 A | 4/2015 |
| CN | 104898128 A | 9/2015 |

(Continued)

OTHER PUBLICATIONS

CNIPA First Office Action for corresponding CN Application No. 201980017351.4.

(Continued)

*Primary Examiner* — Isam A Alsomiri
*Assistant Examiner* — Sanjida Naser
(74) *Attorney, Agent, or Firm* — CANTOR COLBURN LLP

(57)      ABSTRACT

A light detection device detects incident light acc ding to a detection start timing. The light detection device includes a plurality of photosensors, a signal combining circuit, a detection circuit, and at least one time measurement circuit. The plurality of photosensors receive light to generate output signals indicating light reception results, respectively. The signal combining circuit sums a plurality of output signals from the respective photosensors to generate a combined signal. The detection circuit detects a timing, at which the combined signal is maximized after the detection start timing, to generate a detection signal indicating the (Continued)

detected timing. The time measurement circuit measures a count period between the detection start timing and the detected timing based on the detection signal.

9 Claims, 11 Drawing Sheets

(56) References Cited

U.S. PATENT DOCUMENTS

| | | | |
|---|---|---|---|
| 2012/0085891 A1 | 4/2012 | Cho et al. | |
| 2015/0177369 A1 | 6/2015 | Kostamovaara | |
| 2015/0253426 A1 | 9/2015 | Yasugi | |
| 2015/0261338 A1 | 9/2015 | Shimizu | |
| 2015/0316650 A1 | 11/2015 | Imai | |
| 2018/0210084 A1* | 7/2018 | Zwölfer | G01S 7/4865 |
| 2018/0372538 A1* | 12/2018 | Hata | H03K 5/1534 |
| 2019/0179018 A1* | 6/2019 | Gunnam | G01S 17/86 |
| 2020/0379111 A1* | 12/2020 | Kimura | G01S 17/10 |

FOREIGN PATENT DOCUMENTS

| | | |
|---|---|---|
| EP | 3128346 A2 | 2/2017 |
| JP | 2006308357 A | 11/2006 |
| JP | 2008020203 A | 1/2008 |
| JP | 2011226922 A | 11/2011 |
| JP | 2012084877 A | 4/2012 |
| JP | 5644294 B2 | 11/2014 |

OTHER PUBLICATIONS

International Search Report for International Application No. PCT/JP2019/009225; Date of Mailing, Apr. 2, 2019.
Written Opinion of the International Search Authority for International Application No. PCT/JP2019/009225; Date of Mailing, Apr. 2, 2019.

* cited by examiner

OUTPUT SIGNAL Sa
OF SPAD10a

OUTPUT SIGNAL Sb
OF SPAD10b

OUTPUT SIGNAL Sc
OF SPAD10c

COMBINED
SIGNAL S1

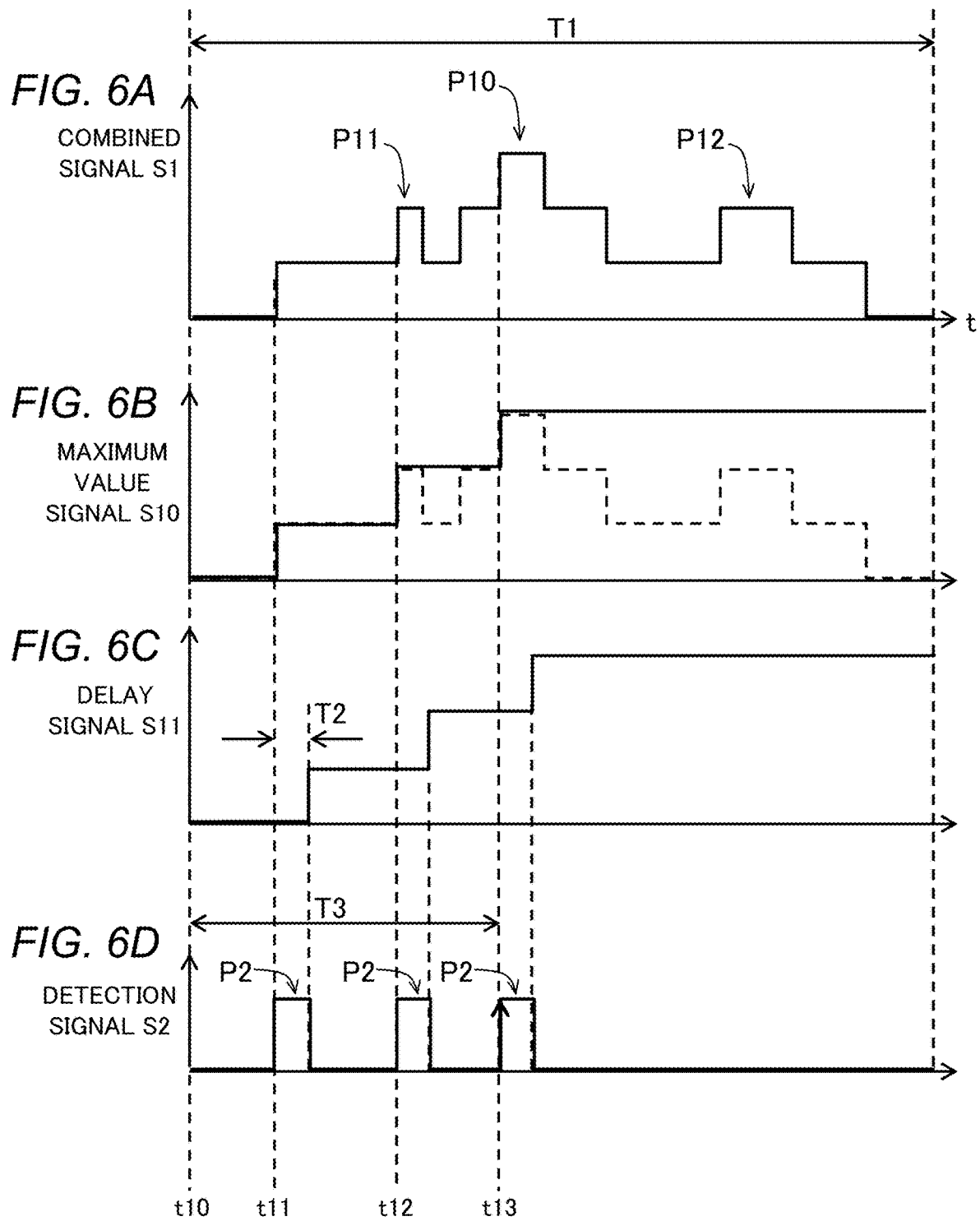

COMBINED SIGNAL S1

P10

P12

T1 t

MAXIMUM VALUE SIGNAL S10

DELAY SIGNAL S11A

T2A

DETECTION SIGNAL S2A

P2A

T3

P2A t10  t21 t22  t23

T4

T2A

COMBINED
SIGNAL S1

MAXIMUM
VALUE
SIGNAL S10

DELAY
SIGNAL S11A

DETECTION
SIGNAL S2A

LIGHT DETECTION DEVICE, LIGHT DETECTION METHOD AND OPTICAL DISTANCE SENSOR

CROSS REFERENCE TO RELATED APPLICATIONS

This is the U.S. national stage of application No. PCT/JP2019/009225, filed on Mar. 8, 2019. Priority under 35 U.S.C. § 119 (a) and 35 U.S.C. § 365 (b) is claimed from Japanese Application No. 2018-048001, filed Mar. 15, 2018, the disclosure of which is also incorporated herein by reference.

TECHNICAL FIELD

The present disclosure relates to a light detection device, a light detection method, and an optical distance sensor including the light detection device.

BACKGROUND ART

There is known an optical distance sensor that uses time of flight (TOF) of light. The optical distance sensor irradiates an object with light and detects the light reflected by the object, thereby measuring a distance corresponding to the time of fight of light traveling back and forth to the object. In the optical distance sensor, a technique using a single photon avalanche photodiode (SPAD) for light detection is proposed (e.g., Patent Documents 1 and 2).

Patent Document 1 discloses a distance measurement device including a plurality of SPADs in a receiver unit. The distance measurement device of Patent Document 1 determines that a measurement pulse is detected when a summated signal indicating the sum of electrical pulses output from the plurality of SPAD crosses a predetermined threshold and a rising slope of the summated signal crosses a predetermined slope threshold.

Patent Document 2 discloses a light detector including a plurality of SPADs in an optical distance measurement device. The light detector of Patent Document 2 sums rectangular pulses output from the plurality of SPADs, compares a summed output value with a predetermined reference value, and outputs a trigger signal according to a comparison result.

CITATION LIST

Patent Document

Patent Document 1: US 2015/0177369 A1
Patent Document 2: JP 5644294 B

SUMMARY

Technical Problem

The SPAD responds to even one photon, but the reaction is stochastic. Thus, the rise of the summed signal is steeper as the number of received photons increases, and gentler as the number of received photons decreases. Accordingly, the distance measurement device of Patent Document 1 or the like fails to detect light having a little number of photons with the slope threshold set larger, and erroneously detects disturbance light with the slope threshold set smaller. Thus, it is difficult to accurately perform light detection in the optical distance sensor in the related art.

An object of the present disclosure is to provide a light detection device, a light detection method, and an optical distance sensor capable of accurately performing light detection in an optical distance sensor.

Solution to Problem

A light detection device according to the present disclosure detects incident light according to a detection start timing. The light detection device includes a plurality of photosensors, a signal combining circuit, a detection circuit, and at least one time measurement circuit. The plurality of photosensors receive light to generate output signals indicating light reception results, respectively. The signal combining circuit sums a plurality of output signals from the respective photosensors to generate a combined signal. The detection circuit detects a timing, at which the combined signal is maximized after the detection start timing, to generate a detection signal indicating the detected timing. The time measurement circuit measures a count period between the detection start timing and the detected timing based on the detection signal.

A light detection method according to the present disclosure provides a method by which a light detection device detects incident light according to a detection start timing.

An optical distance sensor according to the present disclosure includes a light projector that projects light, and a light detection device. The time measurement circuit in the light detection device measures the count period using a timing at which the light projector projects light as the detection start timing.

Advantageous Effect

With the light detection device, the light detection method, and the optical distance sensor according to the present disclosure, it is possible to accurately perform the light detection in the optical distance sensor.

BRIEF DESCRIPTION OF THE DRAWINGS

FIGS. 6A to 6D are timing charts illustrating an operation of the light detection device according to the first embodiment.

DETAILED DESCRIPTION

Hereinafter, embodiments of a light detection device, a light detection method, and an optical distance sensor according to the present disclosure will be described with reference to the accompanying drawings. Note that, the same components are denoted by the same reference signs in each of the following embodiments.

APPLICATION EXAMPLE

Figure 1:
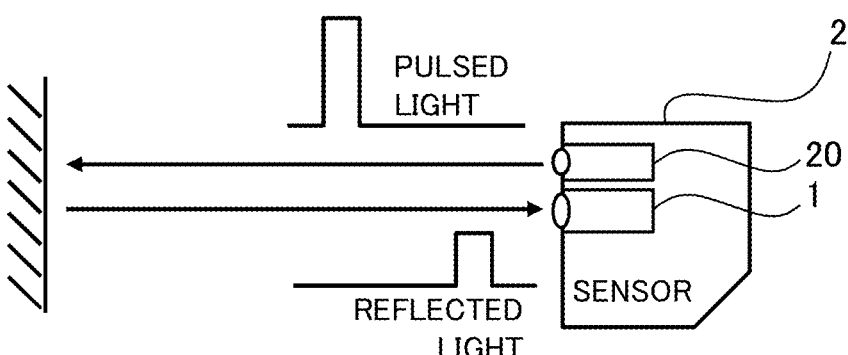
FIG. 1 is a view for describing an application example of a light detection device according to the present disclosure.

An example to which a light detection device according to the present disclosure can be applied will be described with reference to FIG. 1. FIG. 1 is a view for describing an application example of a light detection device 1 according to the present disclosure.

The light detection device 1 according to the present disclosure is applied to a TOF-type optical distance sensor 2. The optical distance sensor 2 includes a light projector 20 that projects pulsed light to the outside, for example, as illustrated in FIG. 1. The light detection device 1 constitutes a receiver unit, which receives light from the outside, in the optical distance sensor 2.

The optical distance sensor 2 according to the present disclosure can be applied to, a photoelectric sensor for industrial automation applications, for example. The optical distance sensor 2 detects reflected light of the pulsed light projected from the light projector 20 using the light detection device 1 to measure a distance to an object that reflects the light based on time of flight of the light. The optical distance sensor 2 can detect whether the object is located at a specific position.

In the present application example, for improving the sensitivity of light detection or the like in the optical distance sensor 2, an SPAD is used as a sensor element i.e. a photosensor in the light detection device 1. The SPAD is so highly sensitive as to be capable of obtaining output even with incidence of one photon. Thus, the SPAD is also sensitive to disturbance light. In the present application example, highly accurate light detection that is robust to the disturbance light is implemented by signal processing of the output of the SPAD in the light detection device 1, and the accuracy of the distance measurement of the optical distance sensor 2 is improved.

Configuration Example

Hereinafter, embodiments as configuration examples of the light detection device 1 and the optical distance sensor 2 will be described.

First Embodiment

Figure 2:
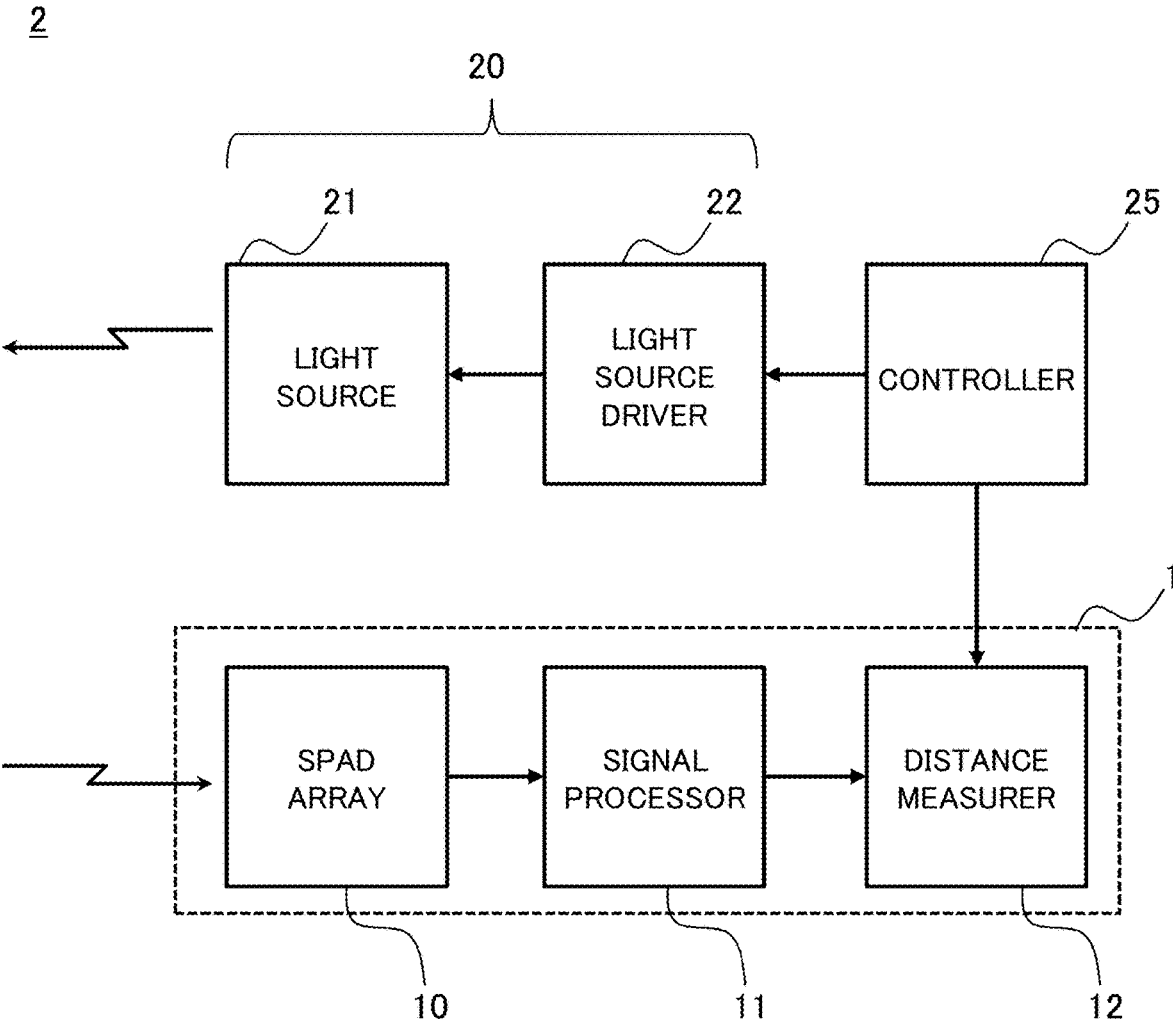
FIG. 2 is a block diagram illustrating a configuration of an optical distance sensor according to a first embodiment.

In the first embodiment, the light detection device 1 and the optical distance sensor 2 that detect a timing at which the number of SPADs that have detected photons reaches a maximum will be described.
1. Configuration
The configurations of the optical distance sensor 2 and the light detection device 1 according to the first embodiment will be described hereinafter.
1-1. Configuration of Optical Distance Sensor
The configuration of the optical distance sensor 2 according to the present embodiment will be described with reference to FIG. 2. FIG. 2 is a block diagram illustrating the configuration of the optical distance sensor 2.

The optical distance sensor 2 includes the light projector 20, a controller 25, and the light detection device 1, for example, as illustrated in FIG. 2. The light projector 20 includes, for example, a light source 21 and a light source driver 22.

In the light projector 20, the light source 21 includes, for example, an LD (laser diode) or an LED. The light source 21 emits light such as visible light and near infrared light. The light source driver 22 is a circuit that drives the light emission of the light source 21. The light source driver 22 causes the light source 21 to emit light of a pulse shape, that is, pulsed light, at a timing controlled by the controller 25. The pulsed light has a pulse width of, for example, several nanoseconds to several tens of nanoseconds.

The controller 25 includes, for example, a CPU, a RAM, a ROM, and the like, and controls each component. For example, the controller 25 generates various control signals so as to control the entire operation of the optical distance sensor 2.

As illustrated in FIG. 2, the light detection device 1 includes a SPAD array 10, a signal processor 11, and a distance measurer 12, for example. The light detection device 1 includes, for example, an amplifier that amplifies an electric signal generated by the SPAD in response to incident light, a drive circuit for the SPAD, and the like, in the SPAD array 10 or the signal processor 11.

The SPAD array 10 is configured by arranging a plurality of SPADs in an array form. Each SPAD of the SPAD array 10 is implemented by operating an avalanche photodiode (APD) in a Geiger mode.

Figure 3:
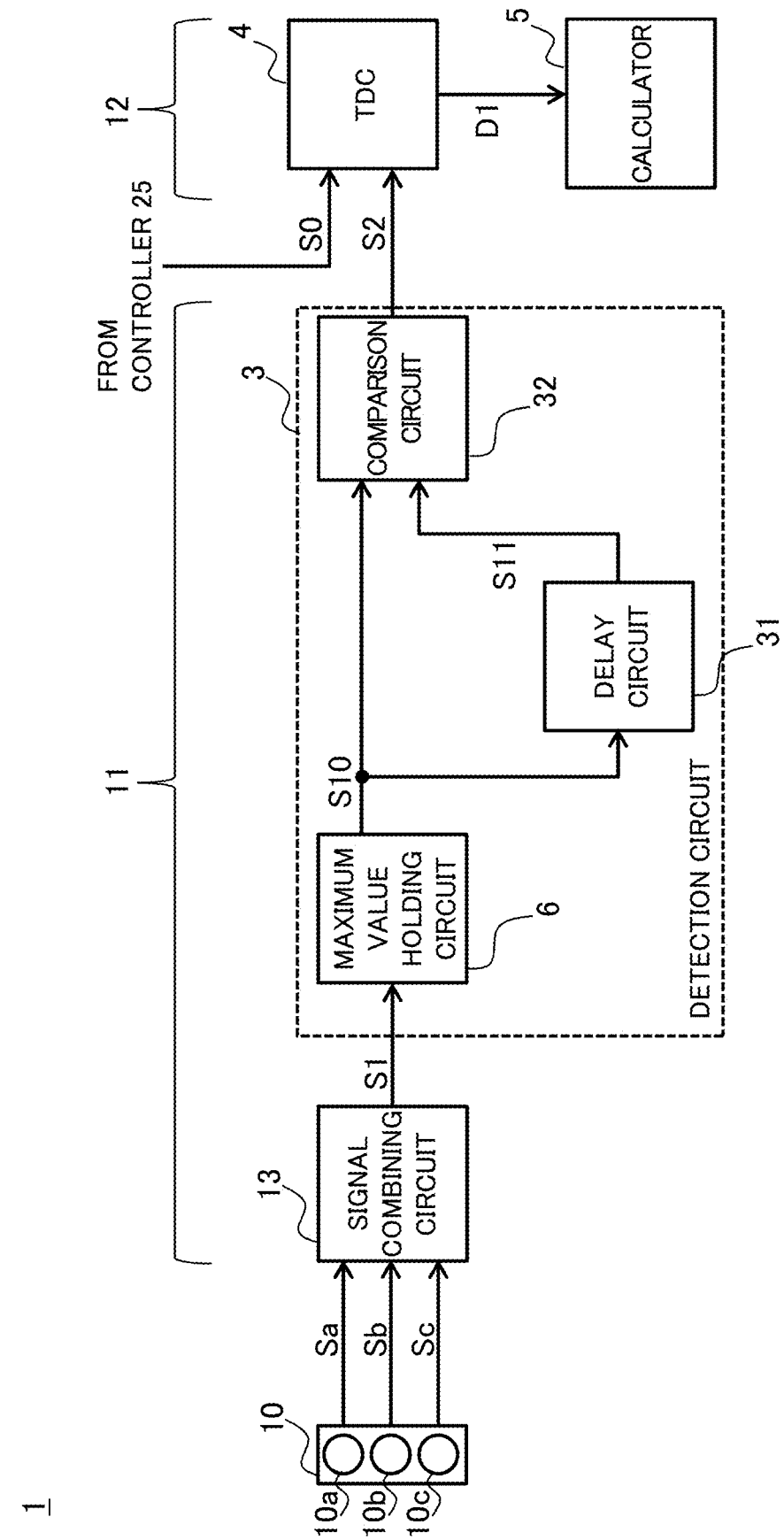
FIG. 3 is a block diagram illustrating a configuration of a light detection device according to the first embodiment.

The signal processor 11 performs signal processing, configured to detect a timing at which light as a detection target of the light detection device 1 arrives, based on the output signal output from the SPAD array 10. The distance measurer 12 calculates a distance value indicating a distance according to time of flight of light based on a signal processing result of the signal processor 11. Details of the configuration of the light detection device 1 will be described hereinafter.
1-2. Configuration of Light Detection Device
A configuration example of the light detection device 1 according to the first embodiment will be described with reference to FIG. 3. FIG. 3 is a block diagram illustrating the configuration of the light detection device 1 according to the present embodiment.

As illustrated in FIG. 3, the light detection device 1 of the present embodiment includes a plurality of SPADs 10a to 10c that constitute the SPAD array 10, and a signal combining circuit 13 and a detection circuit 3 that constitute a signal processor 11. In addition, the light detection device 1 includes, for example, a TDC (time/digital converter) 4 and a calculator 5 which constitute the distance measurer 12.

The SPADs 10a to 10c are examples of photosensors stochastically respond to photons incident in the light detection device 1. Hereinafter, an example in which the number of the SPADs 10a to 10c in the SPAD array 10 is three will be described.

Each of the SPADs 10a, 10b, and 10c receives light and generates output signals Sa, Sb, and Sc, indicating a light reception result, respectively. For example, a waveform shaping circuit, which shapes signal waveforms of the output signals Sa to Sc of the SPADs 10a to 10c into rectangular pulse shapes, is appropriately incorporated in the light detection device 1. The respective output signals Sa to Sc from the SPAD array 10 are input to the signal combining circuit 13 of the signal processor 11.

The signal combining circuit 13 sums up the plurality of output signals Sa to Sc thus input therein to generate a combined signal S1. The signal combining circuit 13 outputs the combined signal S1 thus generated to the detection circuit 3. The signal combining circuit 13 can be configured by applying a known technique (for example, see Patent Document 2).

Based on the combined signal S1 from the signal combining circuit 13, the detection circuit 3 detects the timing of the light obtained as a detection target of the light detection device 1, to generate a detection signal S2 indicating a detection result. In the present embodiment, the detection circuit 3 includes a maximum value holding circuit 6, a delay circuit 31, and a comparison circuit 32 as illustrated in FIG. 3.

The maximum value holding circuit 6 holds maximum values of the input combined signal S1 successively to generate a maximum value signal S10. The maximum value signal S10 indicates a provisional maximum value of the combined signal S1. In the present embodiment, the maximum value holding circuit 6 outputs the maximum value signal S10 to the delay circuit 31 and the comparison circuit 32. A configuration example of the maximum value holding circuit 6 will be described later.

The delay circuit 31 of the present embodiment delays the maximum value signal S10 by a predetermined delay period to generate a delay signal S11. The delay circuit 31 outputs the delay signal S11 to the comparison circuit 32.

The comparison circuit 32 performs determination by comparing the maximum value signal S10 with the delay signal S11, and generates the detection signal S2 according to a determination result. The comparison circuit 32 of the present embodiment generates the detection signal S2 as the result of determination on whether or not the maximum value signal S10 is larger than the delay signal S11.

The detection signal S2 from the detection circuit 3 is input to the TDC 4. In addition, a detection start timing signal S0 is input to the TDC 4 from the controller 25. The detection start timing signal S0 is an example of a control signal indicating a time measurement start timing of the TDC 4.

The TDC 4 is an example of a time measurement circuit that generates time information as a digital value (time/digital conversion) to measure time. The TDC 4 measures a count period that is from the timing indicated by the detection start timing signal S0 to the timing indicated by the detection signal S2 based on the detection start timing signal S0 and the detection signal S2, and generates time information D1 indicating the count period as a measurement result.

The calculator 5 includes, for example, a CPU that executes various arithmetic processes in cooperation with software, a RAM, a ROM, and the like. The calculator 5 operates as the distance measurer 12 together with the TDC 4. Specifically, the calculator 5 acquires the time information D1 indicating the measured count period from the TDC 4, and executes an operation for calculating a distance according to the time of flight of light.

Note that hardware resources such as the CPU constituting the calculator 5 may be shared by the controller 25 of the optical distance sensor 2 or may be separately provided. In addition, the calculator 5, the controller 25, and the like may be configured by various hardware circuits such as an ASIC and an FPGA.

1-2-1. Maximum Value Holding Circuit

Figure 4:
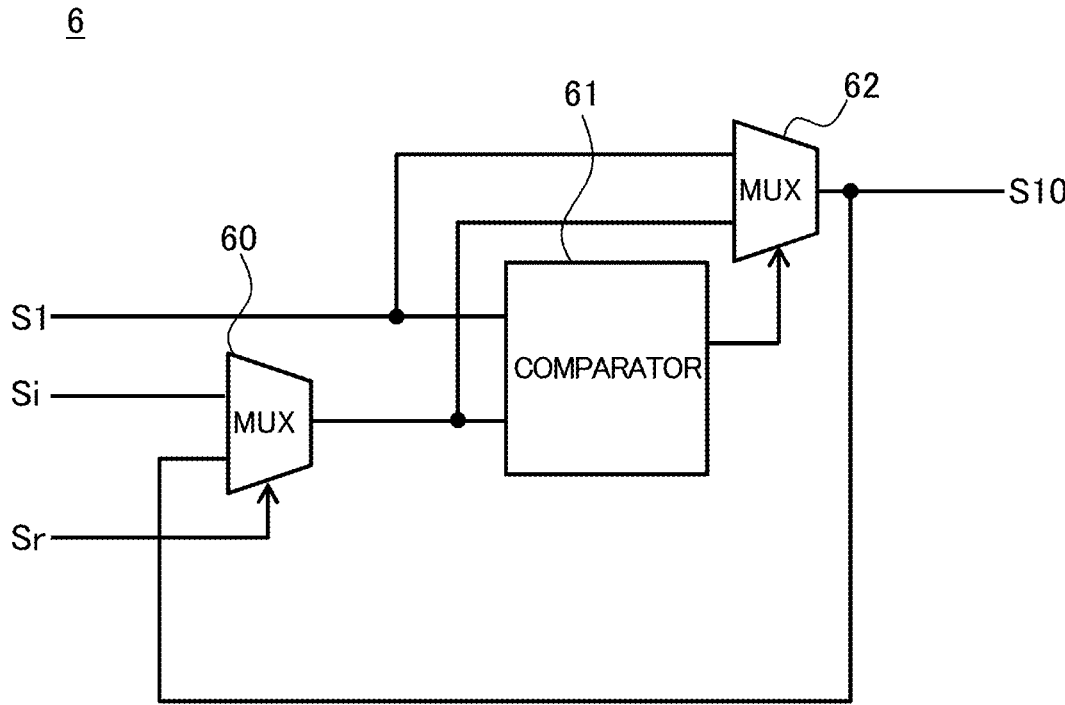
FIG. 4 is a circuit diagram illustrating a configuration example of a maximum value holding circuit in the light detection device.

A configuration example of the maximum value holding circuit 6 in the light detection device 1 will be described with reference to FIG. 4. FIG. 4 is a circuit diagram illustrating a configuration example of the maximum value holding circuit 6.

As illustrated in FIG. 4, the maximum value holding circuit 6 includes a comparator 61 and two multiplexers 60 and 62, for example. The maximum value holding circuit 6 holds the maximum value of the input combined signal S1 and outputs the held maximum value signal S10.

The combined signal S1 from the signal combining circuit 13 is input to the comparator 61 and the multiplexer 62 in the maximum value holding circuit 6. The multiplexer 60 outputs an initial value signal Si of the maximum value or the maximum value signal S10 to the comparator 61 and the multiplexer 62.

The comparator 61 compares the combined signal S1 with the initial value signal Si or the maximum value signal S10 output from the multiplexer 60. The comparator 61 outputs a signal indicating a comparison result to a control terminal of the multiplexer 62.

The multiplexer 62 switches a signal to be output to an input terminal of the multiplexer 60 between the combined signal S1 and the initial value signal Si or the maximum value signal S10 output from the multiplexer 60, according to the comparison result of the comparator 61.

The multiplexer 60 initializes the maximum value signal S10 according to a reset signal Sr input from the controller 25 (FIG. 2), for example.

According to the maximum value holding circuit 6 of the above configuration example, the maximum value signal S10 can be updated every time the maximum value in the combined signal S1 is updated.

2. Operation

The operations of the optical distance sensor 2 and the light detection device 1 configured as described above will be described hereinafter.

In the optical distance sensor 2, the controller 25 (FIG. 2) controls the light source driver 22 of the light projector 20 to cause the light source 21 to emit pulsed light at predetermined time intervals, for example. When the projected pulsed light is reflected by an object which is a distance measurement target of the optical distance sensor 2, the projected pulsed light can be incident onto the optical distance sensor 2 as the reflected light.

At the time of controlling the light projector 20, the controller 25 generates the detection start timing signal S0 indicating the timing for light projection, and outputs the detection start timing signal S0 to the TDC 4 (FIG. 3) of the distance measurer 12.

In synchronization with the light projection of the light projector 20, the light detection device 1 in the optical distance sensor 2 performs light detection to detect the reflected light of the pulsed light during a predetermined light reception from the timing at which light is projected. The light reception period is set to a period shorter than the time interval of the pulsed light, for example, and may be set in view of the time of flight of light corresponding to an upper limit of a distance to be measured (for example, the light reception period of 200 ns for the distance upper limit of 30 m). For example, immediately before light projection or the like, the controller 25 may output the reset signal Sr to the maximum value holding circuit 6 so as to set a maximum value as the initial value (see FIG. 4).

In the light detection of the light detection device 1, the SPAD array 10 receives light, and the signal processor 11 performs signal processing on a signal as a light reception result, thereby generating the detection signal S2 indicating the timing when the reflected light arrives. Based on the detection signal S2, the distance measurer 12 measures the time of flight, taken until the projected pulsed light is reflected by the object and received by the TDC 4, as a count period. The distance measurer 12 calculates a distance value by multiplying, for example, half of the measured count period by the speed of light.

By using the SPADs 10a to 10c in the light detection device 1 in the above optical distance sensor 2, it is possible to increase the sensitivity of light detection and improve the accuracy of the distance measurement. However, since the SPADs 10a to 10c are highly sensitive as well as reacting to disturbance light, the influence of noise caused by the disturbance light is conceivable. Here, the reflected light of the pulsed light is received together at a timing as a detection target. Thus, it is expected that the number of photons at the timing is larger than the number of photons of only the disturbance light at other timings.

Therefore, the light detection device 1 of the present embodiment detects the timing at which the combined signal S1 of the output signals Sa to Sc from the SPADs 10a to 10c reaches a maximum, and uses the detected timing as the timing at which the reflected light arrives. Hereinafter, details of the operation of the light detection device 1 of the present embodiment will be described.

2-1. Operation of Light Detection Device

Details of the operation of the light detection device 1 according to the present embodiment will be described with reference to FIGS. 5 and 6.

FIGS. 5A to 5D are timing charts for describing a method of combining the combined signal S1 in the light detection device 1. FIGS. 6A to 6D are timing charts illustrating the operation of the light detection device 1.

In the light detection device 1 (FIG. 3) of the present embodiment, the SPADs 10a to 10c receive light in the respective stochastic operations and generate the output signals Sa, Sb, and Sc, respectively. The signal waveforms of the output signals Sa, Sb, and Sc are illustrated in FIGS. 5A, 5B, and 5C, respectively.

Figures 5A, 5B, 5C, 5D:
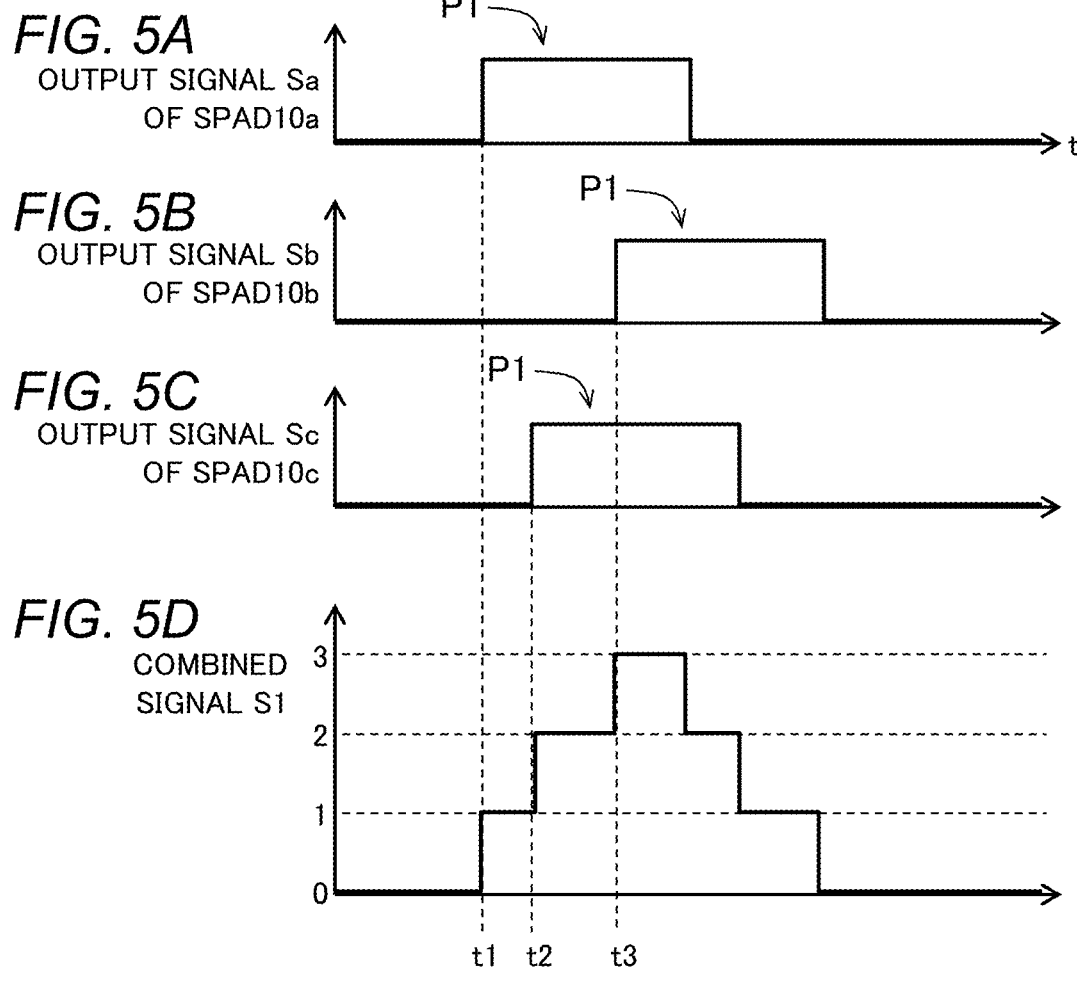
FIGS. 5A to 5D are timing charts for describing a method of combining a combined signal in the light detection device.

In the example of FIGS. 5A to 5C, each of the output signals Sa to Sc is a rectangular pulse P1 having a predetermined pulse width. Each of the SPADs 10a to 10c stochastically reacts to incident photons, so that the rectangular pulse P1 is generated in each of the output signals Sa to Sc.

In the example of FIGS. 5A to 5C, the output signal Sa of the first SPAD 10a rises at time t1 (FIG. 5A), and the output signal Sb of the second SPAD 10b rises at time t3 after time t1 (FIG. 5B). In addition, the output signal Sa of the third SPAD 10a rises at time t2 between time t1 and time t3 (FIG. 5C).

The signal combining circuit 13 sums up the output signals Sa to Sc from the SPADs 10a to 10c to generate the combined signal S1. The combined signal S1 based on the output signals Sa to Sc in FIGS. 5A to 5C is illustrated in FIG. 5D.

The combined signal S1 illustrated in FIG. 5D is the sum of the three output signals Sa to Sc (FIGS. 5A to 5C) at the same time. For example, the sum of the combined signal S1 is one according to the output signal Sa of FIG. 5A from time t1 to time t2.

In addition, the combined signal S1 in the example of FIG. 5D increases from "1" to "2" at time t2 by the sum of the two rectangular pulses P1 (FIGS. 5A and 5C). The combined signal S1 further increases to "3" at time t3 by the sum of the three rectangular pulses P1 (FIGS. 5A to 5C). In this manner, a signal level of the combined signal S1 changes according to the number of the SPADs 10a to 10c with light received. A timing chart of the combined signal S1 when the SPADs 10a to 10c are affected by disturbance light is illustrated in FIG. 6A.

The combined signal S1 in the example of FIG. 6A includes a peak P10 of a reflected light component as a detection target and two peaks P11 and P12 of disturbance light components. The peak P10 of the reflected light component is larger than the peaks P11 and P12 of each disturbance light component, and appears at a timing between the two peaks P11 and P12.

Hereinafter, an example will be described in which the light projector 20 projects light at time t10 and the light detection device 1 performs light detection during a light reception period T1 from time t10 as illustrated in FIGS. 6A to 6D.

In the detection circuit 3 (FIG. 3), the maximum value holding circuit 6 holds the maximum value of the combined signal S1 based on the combined signal S1 from the signal combining circuit 13 and generates the maximum value signal S10. The maximum value signal S10 based on the combined signal S1 in the example of FIG. 6A is illustrated in FIG. 6B.

The maximum value signal S10 illustrated in FIG. 6B is increased for each time when the maximum value after time t10 in the combined signal S1 of FIG. 6A is updated at times t11, t12, and t13 sequentially.

For example, after time t12, the combined signal S1 of FIG. 6A decreases since passing one peak P11, but the maximum value signal S10 holds a signal level of the peak P11 as illustrated in FIG. 6B. In addition, since the combined signal S1 reaches the maximum peak P10 at time t13, the maximum value signal S10 holds a signal level of the same peak P10 after time t13.

When the maximum value signal S10 of FIG. 6B is input for example, the delay circuit 31 generates the delay signal S11 as illustrated in FIG. 6C. The delay signal S11 of the present embodiment has a delay from the maximum value signal S10 by a delay period T2.

The comparison circuit 32 performs the above comparison and determination between the maximum value signal S10 and the delay signal S11 to generate the detection signal S2. The detection signal S2 based on the maximum value signal S10 of FIG. 6B and the delay signal S11 of FIG. 6C is illustrated in FIG. 6D.

According to the comparison and determination of the comparison circuit 32 of the present embodiment, a rectangular pulse P2 (hereinafter referred to as a "detection pulse") is formed in the detection signal S2 when the maximum value signal S10 and the delay signal S11 do not match as illustrated in FIG. 6B to 6D. In the example of FIG. 6, three rectangular pulses P2 rise at times t11, t12, and t13. In the present embodiment, each of the detection pulses P2 has a pulse width corresponding to the delay period T2 of the delay circuit 31. The detection signal S2 is input to the TDC 4.

Based on the detection start timing signal S0 from the controller 25 and each of the detection pulses P2 of the detection signal S2, the TDC 4 measures (i.e., performs time/digital conversion of) a period from time t10 indicated by the detection start timing signal S0 to each time t11, t12, and t13, at which each of the detection pulses P2 rises, sequentially. For example, the TDC 4 holds only the new measurement result when repeating the measurement of the period. In this case, the TDC 4 lastly measures a period T3 from time t10 to time t13, and holds information indicating the period T3 as the count period, in the example of FIG. 6D.

The calculator 5 acquires the time information D1 indicating the count period T3 from the TDC 4, for example, after the lapse of the light reception period T1. As the distance measurer 12, the calculator 5 calculates the distance value by performing an operation such as multiplication of the count period T3 and a predetermined coefficient.

According to the above operation of the light detection device 1, the detection circuit 3 detects time t13 at which the combined signal S1 is maximized based on the combined signal S1 obtained by summing up the output signals Sa to Sc of the SPADs 10a to 10c. As a result, even if the peaks P11 and P12 of the disturbance light components exist before and after the peak P10 of the reflected light component as a detection target, it is possible to detect the timing (time t13) as a detection target. Thus, it is possible to accurately perform the measurement of the count period T3 by the TDC 4.

3. Summary

As described above, the light detection device 1 according to the present embodiment detects incident light according to the timing (light projection timing) indicated by the detection start timing signal S0. The light detection device 1 includes the plurality of SPADs 10a to 10c, the signal combining circuit 13, the detection circuit 3, and the TDC 4. Each of the SPADs 10a to 10c receives light and generates each of the output signals Sa to Sc indicating the light reception results. The signal combining circuit 13 sums up the plurality of output signals Sa to Sc from the SPADs 10a to 10c to generate the combined signal S1. The detection circuit 3 detects the timing, at which the combined signal S1 is maximized after the light projection timing, to generate the detection signal S2 indicating the detected timing. The TDC 4 measures the count period T3 that is a period between the light projection timing and the detected timing based on the detection signal S2.

According to the above light detection device 1, by detecting the timing at which the number of the SPADs 10a to 10c having received light simultaneously is maximized, it is possible to accurately perform the light detection of the detection target such as the reflected light of the pulsed light from the light projector 20, even in a situation with the influence of disturbance light.

In the present embodiment, the photosensors of the light detection device 1 are the SPADs 10a to 10c that stochastically react to the incident photons. Even if each of the SPADs 10a to 10c reacts to the disturbance light, it is possible to accurately perform the light detection using the maximum value of the combined signal S1.

In the present embodiment, the detection circuit 3 includes the maximum value holding circuit 6 that generates the maximum value signal S10 holding the maximum value updated for each time the combined signal S1 updates the maximum value. With the maximum value signal S10 of the maximum value holding circuit 6, it is possible to detect the timing at which the maximum value in the combined signal S1 is updated.

In the present embodiment, the detection circuit 3 further includes the delay circuit 31 and the comparison circuit 32. The delay circuit 31 delays the maximum value signal S10 by the predetermined delay period T2 to generate the delay signal S11. The comparison circuit 32 compares the maximum value signal S10 and the delay signal S11 with each other, to output the detection signal S2 so as to indicate the timing at which the maximum value signal S10 exceeds the delay signal S11. With the simple circuit configuration of the detection circuit 3 as described above, it is possible to detect the maximum value timing in the combined signal S1.

In addition, the optical distance sensor 2 according to the present embodiment includes the light projector 20 that projects light, and the light detection device 1. The TDC 4 of the light detection device 1 measures the count period T3 using the timing at which the light projector 20 projects light as the detection start timing. According to the optical distance sensor 2 of the present embodiment, it is possible to accurately perform the light detection in the light detection device 1 and to improve the accuracy of the distance measurement.

In addition, the light detection method according to the present embodiment is the method by which the light detection device 1 detects incident light according to the detection start timing. The present method includes: receiving light at the plurality of SPADs 10a to 10c to generate each of the output signals Sa to Sc indicating the light reception result; and summing up the plurality of output signals Sa to Sc to generate the combined signal S1. Further, the present method includes: detecting the timing, at which the combined signal S1 is maximized after the detection start timing, to generate the detection signal S2 indicating the detected timing; and measuring the count period T3 between the detection start timing and the detected timing based on the detection signal S2. According to the present method, it is possible to accurately perform the light detection.

In the above description, the example in which the number of the SAPDs 10a to 10c included in the light detection device 1 is three has been described. The number of SAPDs 10a to 10c included in the light detection device 1 may be four or more, or may be two.

Second Embodiment

In the first embodiment, the light detection device 1 using the delay signal S11 of the maximum value signal S10 to detect the timing at which the combined signal S1 is maximized has been described. In a second embodiment, a light detection device using a delay signal of the combined signal S1 will be described with reference to FIGS. 7 and 8.

Figure 7:
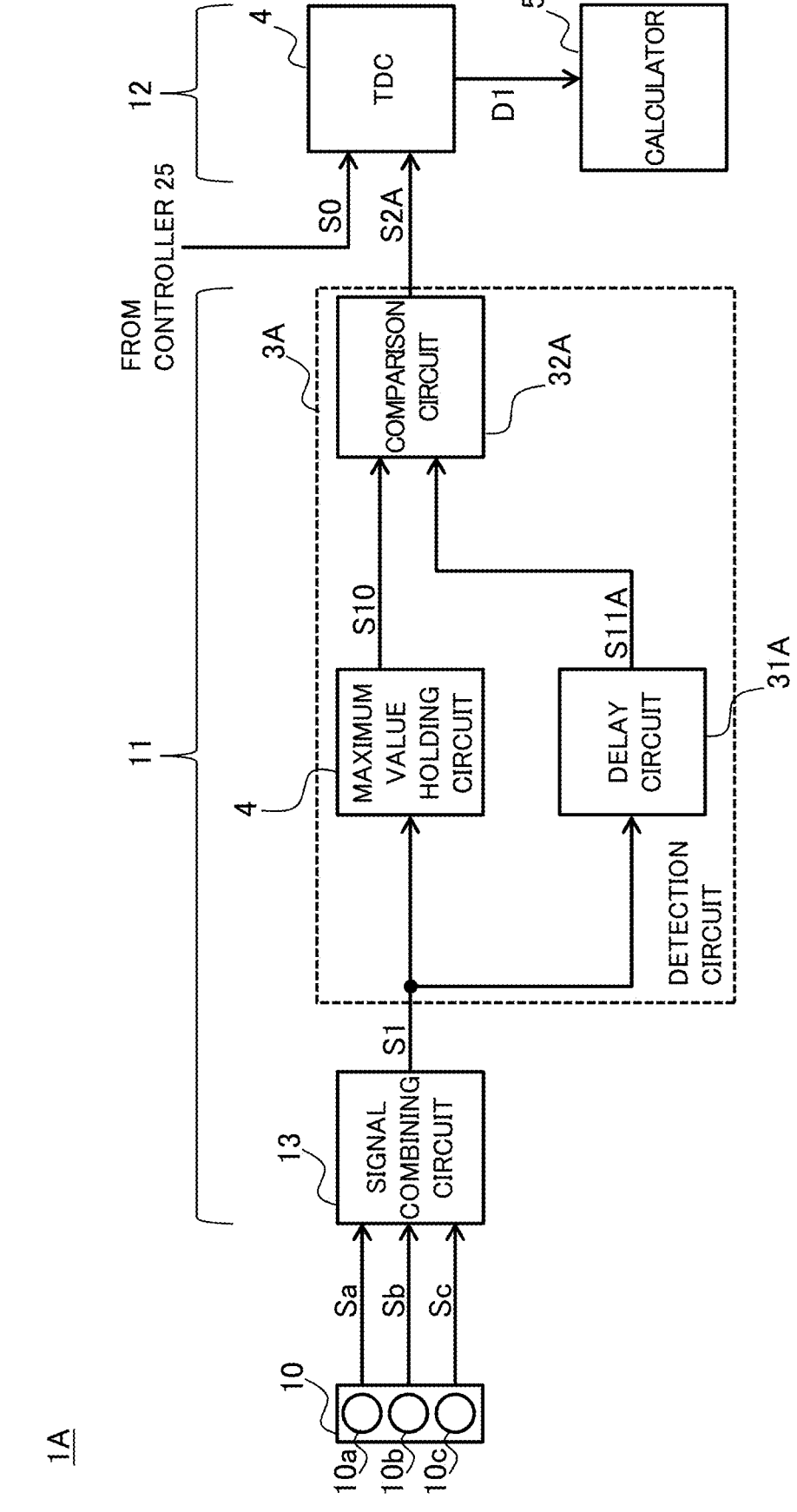
FIG. 7 is a block diagram illustrating a configuration of a light detection device according to a second embodiment.

FIG. 7 is a block diagram illustrating a configuration of a light detection device 1A according to the second embodiment. The light detection device 1A according to the present embodiment is obtained by changing a configuration of a detection circuit 3A as illustrated in FIG. 7 from a configuration similar to that of the light detection device 1 (FIG. 3) of the first embodiment.

As illustrated in FIG. 7, the detection circuit 3A of the present embodiment inputs the combined signal S1 to a delay circuit 31A to delay the combined signal S1. The delay circuit 31A generates a delay signal S11A of the combined signal S1 and outputs the delay signal S11A to a comparison circuit 32A. The comparison circuit 32A of the present embodiment compares the delay signal S11A with the maximum value signal S10, and generates a detection signal S2A as a result of determination on whether or not the delay signal S11A is equal to or larger than the maximum value signal S10.

Figures 8A, 8B, 8C, 8D:
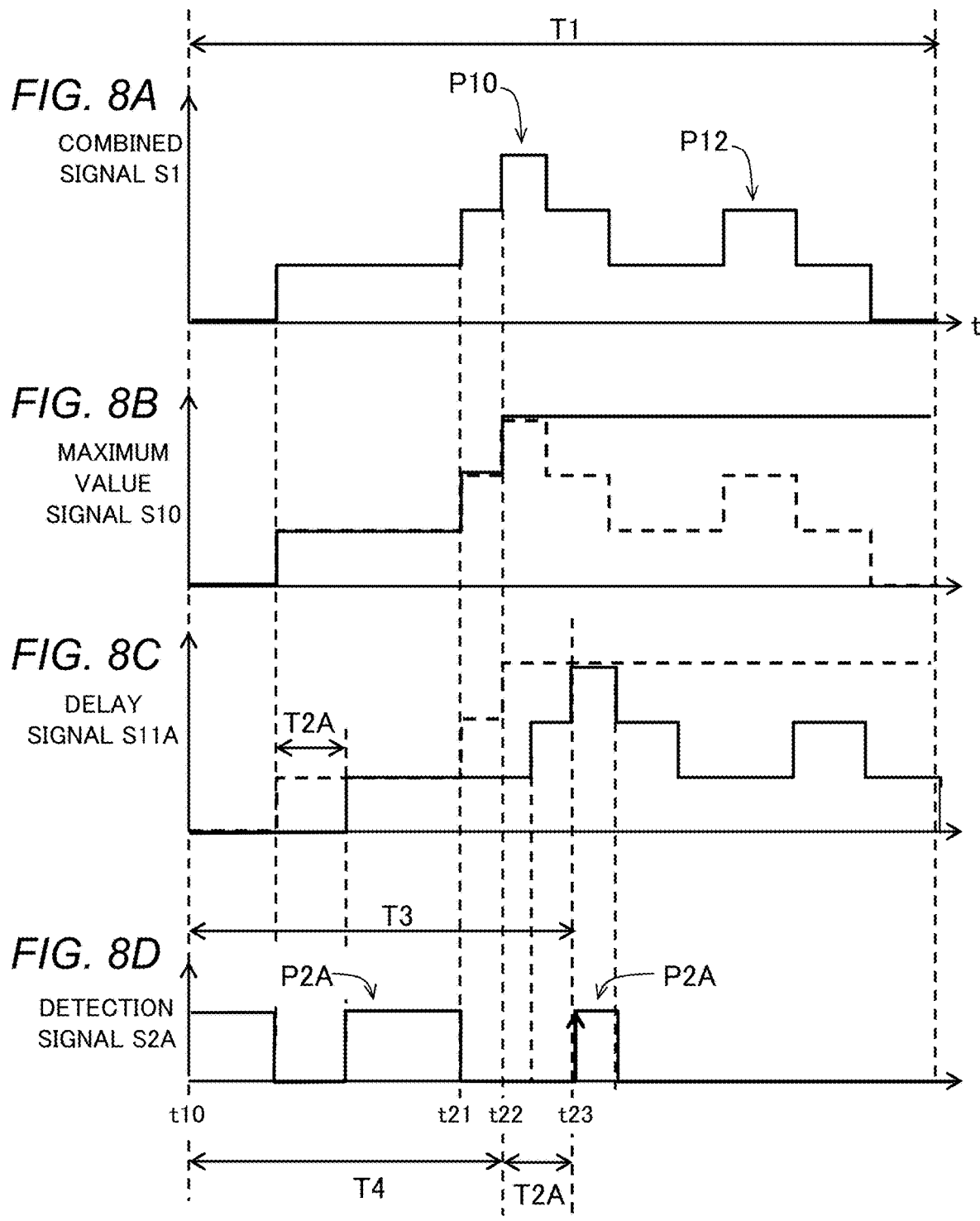
FIGS. 8A to 8D are timing charts illustrating an operation of the light detection device according to the second embodiment.

FIGS. 8A to 8D are timing charts illustrating an operation of the light detection device 1A according to the second embodiment. FIG. 8A is an example of a timing chart of the combined signal S1. FIG. 8B illustrates the maximum value signal S10 based on the combined signal S1 of FIG. 8A. FIG. 8C illustrates the delay signal S11A based on the combined signal S1 of FIG. 8A. FIG. 8D illustrates the detection signal S2A based on the maximum value signal S10 of FIG. 8B and the delay signal S11A of FIG. 8C.

In the example of FIG. 8A to 8D, the maximum value of the combined signal S1 is continuously updated at times t21 and t22 after time t10 of the detection start timing (FIGS. 8A and 8B). As illustrated in FIG. 8C, the delay signal S11A of the present embodiment has a delay corresponding to a delay period T2A from the combined signal S1 (for example, T2A =several nanoseconds to several tens of nanoseconds).

In the light detection device 1A according to the present embodiment, based on the comparison and determination of the comparison circuit 32A described above, a detection pulse P2A rises in the detection signal S2A as illustrated in FIG. 8D when the delay signal S11A matches the maximum value signal S10. In addition, a pulse width of the detection pulse P2A of the present embodiment changes according to a period during which the delay signal S11A matches the maximum value signal S10.

As in the first embodiment, the TDC 4 uses for measuring the period the rise timing of the detection pulse P2A in the detection signal S2A. For example, the TDC 4 measures the count period T3 from time t10 to time t23 at which the last detection pulse P2A rises. The time t23 is delayed by the delay period T2A from time t22 at which the combined signal S1 reaches the maximum peak P10. In the distance measurer 12 of the present embodiment, the calculator 5 or the like corrects the count period T3, which is indicated by the time information D1 from the TDC 4, by the delay period T2A to calculate a distance value based on the calculation of a flight time T4 of light.

According to the light detection device 1A of the present embodiment, for example, when the combined signal S1 rises sharply as at times t21 and t22 in the examples of FIGS. 8A to 8D, the detection pulse P2A rises at a timing (time t23 after the lapse of the delay period T2A) corresponding to time t22 at which the signal reaches a higher signal level as illustrated in FIG. 8D. In this manner, the accuracy of detecting the maximum timing by the light detection device 1A can be improved.

As described above, in the light detection device 1A according to the present embodiment, the delay circuit 31A of the detection circuit 3A delays the combined signal S1 by the predetermined delay period T2A to generate the delay signal S11A. The comparison circuit 32A compares the maximum value signal S10 and the delay signal S11A with each other so as to output the detection signal S2A so as to indicate the timing at which the delay signal S11A reaches the maximum value signal S10. The light detection device 1A described above also enables the highly accurate light detection having robustness to disturbance light.

Third Embodiment

In the light detection devices 1 and 1A of the first and second embodiments, the timing at which the combined signal S1 reaches a maximum is used for the distance measurement. In a third embodiment, a light detection device that uses a plurality of timings from the top of light detection for a distance measurement will be described with reference to FIGS. 9 and 10.

Figure 9:
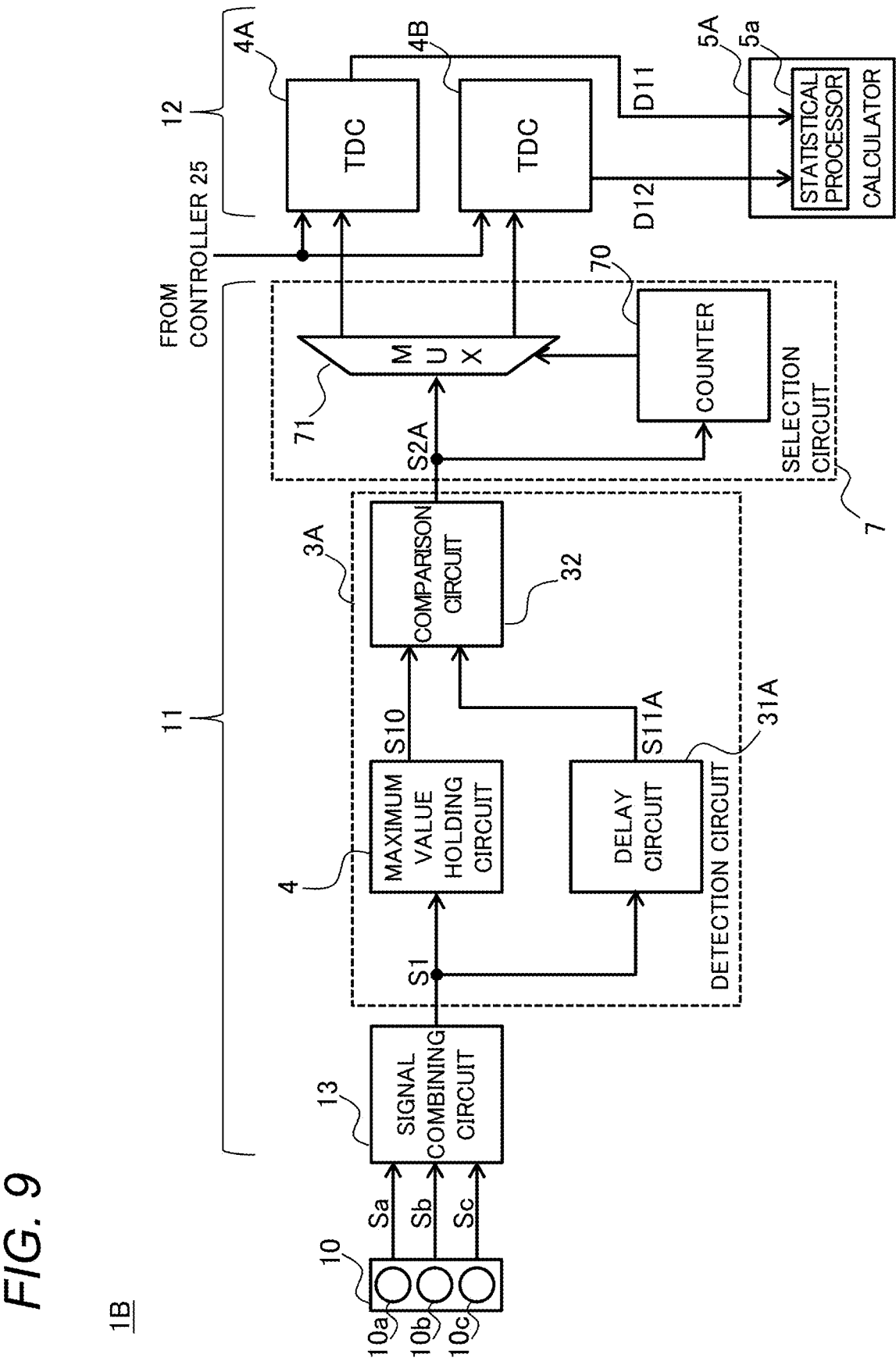
FIG. 9 is a block diagram illustrating a configuration of a light detection device according to a third embodiment.

FIG. 9 is a block diagram illustrating a configuration of a light detection device 1B according to the third embodiment. The light detection device 1B according to the present embodiment includes a plurality of TDCs 4A and 4B as illustrated in FIG. 9 in a configuration similar to that of the light detection device 1A of the second embodiment (see FIG. 7), for example. Further, the light detection device 1B of the present embodiment includes a selection circuit 7 that selects one of the plurality of TDCs 4A and 4B.

Hereinafter, a configuration example in which the number of TDCs 4A to 4B in the light detection device 1B is two will be described. Each of the TDCs 4A and 4B is configured similarly to the TDC 4 of the first and second embodiments. The TDCs 4A and 4B respectively hold time information D11 and D12 each of which indicates a count period.

As illustrated in FIG. 9, the selection circuit 7 includes a counter 70 and a multiplexer 71, for example. The selection circuit 7 selects in turn a TDC for measuring a period among the plurality of TDCs 4A and 4B for each detection pulse P2A of the detection signal S2A.

The counter 70 counts the number of detection pulses P2A in the detection signal S2A. For example, the counter 70 is a 1-bit counter in the configuration example of the two TDCs 4A and 4B. The counter 70 outputs a signal indicating, for example, "0" or "1" as a counting result to a control terminal of the multiplexer 71.

The multiplexer 71 selectively switches the TDC for outputting the detection signal S2A among the plurality of TDCs 4A and 4B, based on the signal from the counter 70. For example, the multiplexer 71 selects one TDC 4A in the case where the signal indicating the count result "0" is input from the counter 70, and selects the other TDC 4B in the case where the signal indicating the count result "1" is input.

In the light detection device 1B of the present embodiment, a calculator 5A includes, for example, a statistical processor 5a that executes statistical processing based on the time information D11 and D12 from the plurality of TDCs 4A and 4B, and performs the distance measurement using the statistical processing. For example, the statistical processor 5a of the calculator 5A calculates an average value of the count periods or the corresponding distances based on the time information D11, D12 indicating the measurement results of the plurality of TDCs 4A and 4B for one-time projection and reception of light.

In addition, the statistical processor 5a may generate a histogram by accumulating the time information D11 and D12 for multiple times of projection and reception of light in a RAM or the like, and may calculate a distance value according to a peak position of the histogram, for example. The number of histogram samples can be increased by using the plurality of TDCs 4A and 4B.

Figures 10A, 10B, 10C, 10D:
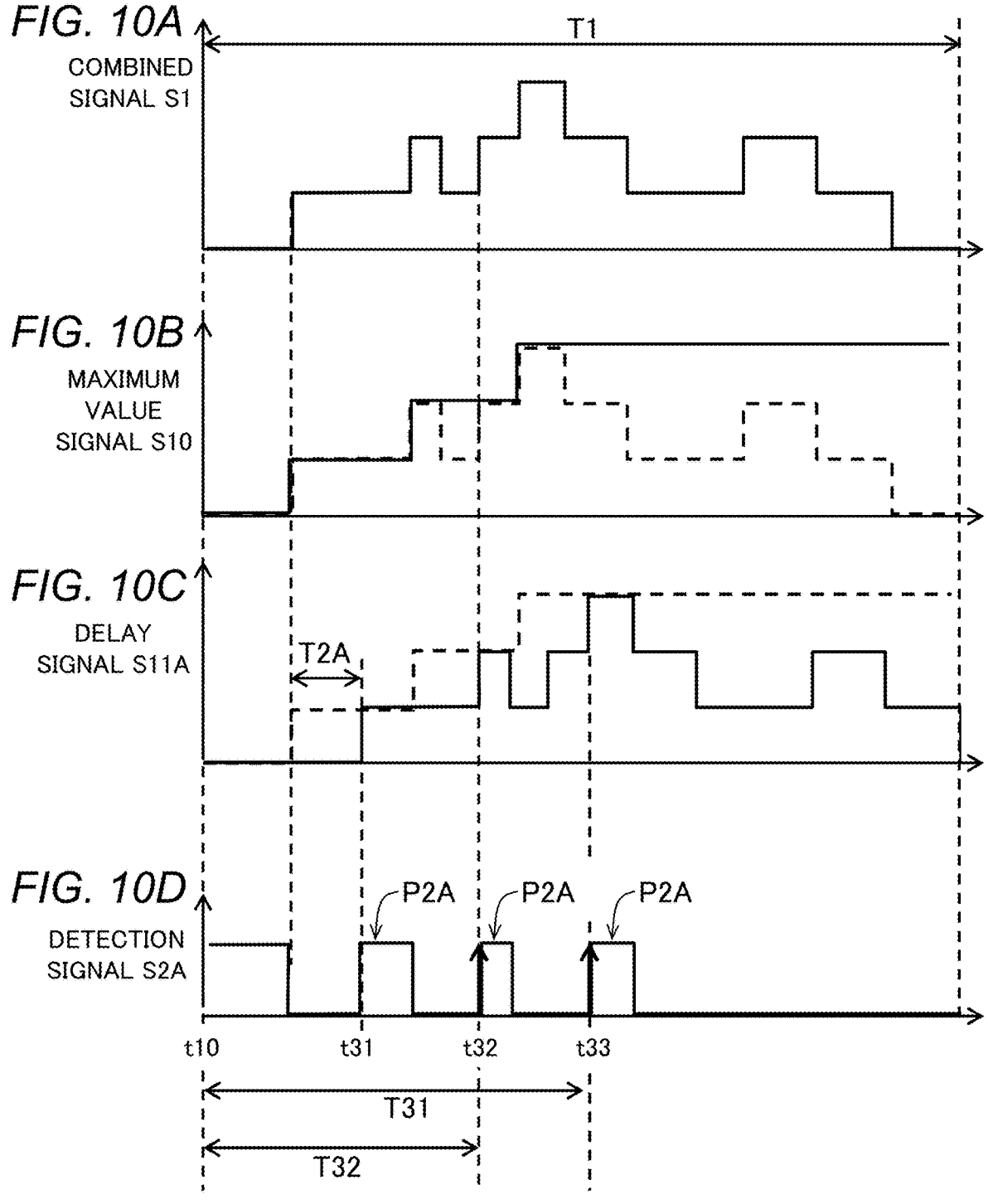
FIGS. 10A to 10D are timing charts illustrating an operation of the light detection device according to the third embodiment.

FIGS. 10A to 10D are timing charts illustrating an operation of the light detection device 1B according to the third embodiment. FIG. 10A is an example of a timing chart of the combined signal S1. FIG. 10B illustrates the maximum value signal S10 based on the combined signal S1 of FIG. 10A. FIG. 10C illustrates the delay signal S11A based on the combined signal S1 of FIG. 10A. FIG. 10D illustrates the detection signal S2A based on the maximum value signal S10 of FIG. 10B and the delay signal S11A of FIG. 10C.

In the example of FIGS. 10A to 10D, at times t31, t32, and t33 after time t10 as a detection start timing, the detection pulse P2A rises sequentially in response to update of the maximum value in the combined signal S1 (FIG. 10D).

In the light detection device 1B of the present configuration example, the selection circuit 7 inputs the detection pulses P2A at times t31, t32, and t33 alternately to the two TDCs 4A and 4B. As a result, count periods T31 and T32 corresponding to the top two timings t32 and t33 from the maximum are finally obtained as the time information D11 and D12 of the two TDC 4A and the TDC 4B.

According to the time information D11 and D12 on the top two timings acquired for each light projection timing as described above, the accuracy of measuring the distance by the optical distance sensor 2 can be improved by performing the statistical processing so as to suppress detection variations caused by stochastic operations of the SPADs 10a to 10c, for example.

In the above description, the configuration example in which the number of TDCs 4A and 4B is two has been described. The light detection device 1B of the present embodiment may include three or more TDCs. In this case, for example, a counter capable of counting the number of TDCs is used for the selection circuit 7 to sequentially switch the TDC caused to perform measurement. As a result, the accuracy of the distance measurement can be improved using top three or more pieces of time information.

As described above, the light detection device 1B according to the present embodiment further includes the statistical processor 5a. The statistical processor 5a acquires the time information D11 and D12 indicating a predetermined number of count periods T31 and T32 from the end among the count periods measured a plurality of times for one light projection timing, to perform the statistical processing on the acquired time information D11 and D12. As a result, it is possible to suppress the detection variations in the SPADs 10a to 10c and improve the detection accuracy of the light detection.

In the present embodiment, the light detection device 1B includes the plurality of TDCs 4A to 4B and the selection circuit 7. The selection circuit 7 switches in turn the TDCs for measuring the count periods T31 and T32 among the plurality of TDCs 4A to 4B at each timing indicated by the detection signal S2A. As a result, it is possible to acquire the time information by the number of TDCs 4A to 4B with the higher order of the number of detected photons. Note that a circuit configuration for acquisition of the plurality of pieces of time information in the higher order is not limited thereto, and various circuit configurations may be used.

Other Embodiments

In the third embodiment, the configuration example of the light detection device 1B including the plurality of TDCs in the configuration similar to that of the light detection device 1A of the second embodiment has been described. The light detection device of the present embodiment is not limited thereto, and may have a plurality of TDCs, for example, in the configuration similar to that of the light detection device 1 of the first embodiment.

Although the configuration example of the detection circuit 3 or 3A is illustrated in each of the above embodiments, the detection circuit of the light detection device is not limited to the above configuration example, and various circuit configurations may be used. A modification of the detection circuit will be described with reference to FIG. 11.

Figure 11:
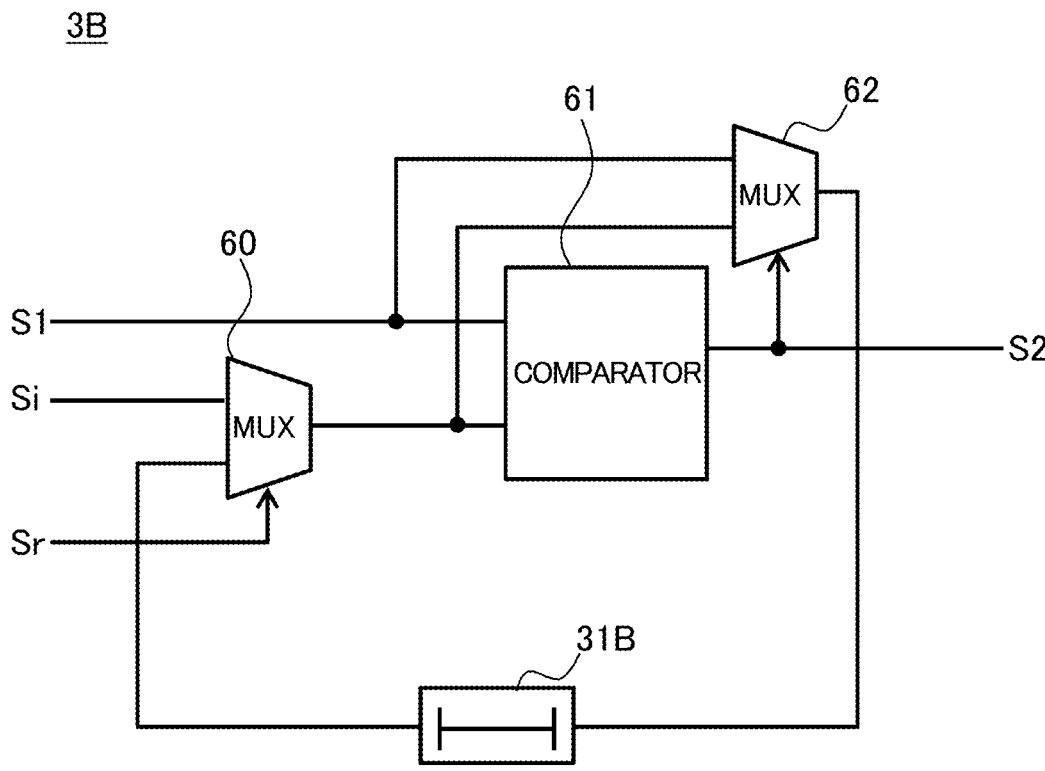
FIG. 11 is a circuit diagram illustrating a modification of a detection circuit in the light detection device.

The light detection device of the present embodiment may include a detection circuit 3B of a modification illustrated in FIG. 11, instead of the detection circuit 3 or 3A of each of the above embodiments, for example.

The detection circuit 3B of the present modification includes, with a configuration similar to the maximum value holding circuit 6 of FIG. 4, a delay circuit 31B for delaying output of one multiplexer 62 to be output to the other multiplexer 60. Then, the output of the comparator 61 is output as the detection signal S2. A pulse width of a detection pulse in the detection signal S2 is adjusted by a delay period of the delay circuit 31B. Even with the light detection device including the detection circuit 3B described above, light detection of a detection target can be accurately performed as in each of the above embodiments.

In addition, the configuration example in which the photosensors of the light detection devices 1 to 1B are the SPADs 10a to 10c has been described in each of the above embodiments. In the present embodiment, the photosensor of the light detection device is not necessarily the SPAD.

In addition, the application example of the optical distance sensor 2 for industrial automation applications has been illustrated in the above description. The application of the optical distance sensor 2 and the light detection devices 1 to 1B according to the present disclosure is not limited thereto, and may be, for example, in-vehicle applications. The optical distance sensor 2 may be, for example, a LiDAR or a distance image sensor.

APPENDIX

As described above, various embodiments of the present disclosure have been described, but the present disclosure is not limited to the above contents, and various modifications can be made within a range where the technical idea is substantially the same. Hereinafter, various aspects according to the present disclosure will be additionally described.

A first aspect according to the present disclosure is a light detection device (1) for detecting incident light according to a detection start timing. The light detection device includes a plurality of photosensors (10a to 10c), a signal combining circuit (13), a detection circuit (3), and at least one time measurement circuit (4). The plurality of photosensors receive light to generate output signals (Sa to Sc) indicating light reception results, respectively. The signal combining circuit sums a plurality of output signals from the respective photosensors to generate a combined signal (S1). The detection circuit detects a timing, at which the combined signal is maximized after the detection start timing, to generate a detection signal (S2) indicating the detected timing. The time measurement circuit measures a count period (T3) between the detection start timing and the detected timing based on the detection signal.

As a second aspect, in the light detection device of the first aspect, the photosensors is a single photon avalanche photodiode (SPAD) configured by an avalanche photodiode operated in a Geiger mode.

As a third aspect, in the light detection device of the first or second aspect, the detection circuit includes a maximum value holding circuit (6) that generates a maximum value signal which is updated for each time the combined signal updates a maximum value.

As a fourth aspect, in the light detection device according to the third aspect, the detection circuit further includes a delay circuit (31) and a comparison circuit (32). The delay circuit delays the maximum value signal by a predetermined delay period to generate a delay signal (S11). The comparison circuit compares the maximum value signal and the delay signal with each other to output the detection signal, which indicates a timing at which the maximum value signal exceeds the delay signal.

As a fifth aspect, in the light detection device (1A) of the third aspect, the detection circuit (3A) further includes a delay circuit (31A) and a comparison circuit (32A). The delay circuit delays the combined signal by a predetermined delay period to generate a delay signal (S11A). The comparison circuit compares a maximum value signal and the delay signal with each other to output a detection signal (S2A), which indicates a timing at which the delay signal reaches the maximum value signal.

As a sixth aspect, the light detection device (1B) according to any one of the first to fifth aspects further includes a statistical processor (5a). The statistical processor acquires information, which indicates a last predetermined number of count periods in multiple count periods measured for one detection start timing, to perform statistical processing on the acquired information.

As a seventh aspect, the light detection device of the sixth aspect includes a plurality of the time measurement circuits. The light detection device further includes a selection circuit (7) that switches in turn the time measurement circuit for measuring the count period among the plurality of time measurement circuits (4A and 4B) at each timing indicated by the detection signal.

An eighth aspect is an optical distance sensor (2) including a light projector (20) that projects light and the light detection device according to any one of the first to seventh aspects. The time measurement circuit in the light detection device measures the count period using a timing at which the light projector projects light as the detection start timing.

A ninth aspect is a light detection method by which a light detection device (1) including a plurality of photosensors (10a to 10c) detects incident light according to a detection start timing. The present method includes: receiving light at the plurality of photosensors to generate each of output signals (Sa to Sc) indicating light reception results; summing the plurality of output signals (Sa to Sc) from the respective photosensors to generate a combined signal (S1). The present method includes: detecting a timing, at which the combined signal is maximized after the detection start timing, to generate a detection signal (S2) indicating the detected timing; and measuring a count period (T3) between the detection start timing and the detected timing based on the detection signal.

REFERENCE SIGNS LIST 1, 1A, 1B light detection device
10a to 10c SPAD
13 signal combining circuit
2 optical distance sensor
20 light projector
3, 3A detection circuit
31, 31A delay circuit
32, 32A comparison circuit
4, 4A, 4B TDC
5, 5A calculator
5a statistical processor
6 maximum value holding circuit
7 selection circuit

The invention claimed is:

1. A light detection device for detecting incident light according to a detection start timing, the light detection device comprising:
a plurality of photosensors configured to receive light to generate output signals indicating light reception results, respectively;
a signal combining circuit configured to sum the plurality of output signals from the respective photosensors to generate a combined signal;
a detection circuit configured to detect a maximum timing to generate a detection signal, based on the combined signal from the signal combining circuit, the maximum timing being a timing at which the combined signal is maximized after the detection start timing, the detection signal indicating the detected maximum timing as a time when the combined signal is maximized; and
at least one time measurement circuit configured to measure a count period in response to detecting the maximum timing by the detection circuit, based on the detection signal input thereto from the detection circuit, the count period being defined from the detection start timing to the detected maximum timing by the detection circuit as the time when the combined signal is maximized.

2. The light detection device according to claim 1, wherein the photosensors are single photon avalanche photodiode each configured by an avalanche photodiode operated in a Geiger mode.

3. The light detection device according to claim 1, wherein the detection circuit comprises a maximum value holding circuit configured to generate a maximum value signal which is updated for each time the combined signal updates a maximum value.

4. The light detection device according to claim 3, wherein the detection circuit further comprises:
a delay circuit configured to delay the maximum value signal by a predetermined delay period to generate a delay signal; and
a comparison circuit configured to compare the maximum value signal and the delay signal with each other to output the detection signal, which indicates a timing at which the maximum value signal exceeds the delay signal.

5. The light detection device according to claim 3, wherein the detection circuit further comprises:
a delay circuit configured to delay the combined signal by a predetermined delay period to generate a delay signal; and
a comparison circuit configured to compare the maximum value signal and the delay signal with each other to output the detection signal, which indicates a timing at which the delay signal reaches the maximum value signal.

6. The light detection device according to claim 1, further comprising a statistical processor configured to acquires information, which indicates a last predetermined number of count periods in multiple count periods measured for one detection start timing, to perform statistical processing on the acquired information.

7. The light detection device according to claim 6, comprising a plurality of the time measurement circuits, and further comprising a selection circuit configured to switch in turn a time measurement circuit for measuring the count period among the plurality of time measurement circuits at each timing indicated by the detection signal.

8. An optical distance sensor comprising:
a light projector that projects light; and
the light detection device according to claim 1,
wherein the time measurement circuit in the light detection device is configured to measure the count period using a timing at which the light projector projects light as the detection start timing.

9. A light detection method by a light detection device comprising a plurality of photosensors for detecting incident light according to a detection start timing, the method including:
receiving light at the plurality of photosensors to generate each of output signals indicating light reception results; and
summing the plurality of output signals from the respective photosensors to generate a combined signal;
detecting a maximum timing to generate a detection signal, based on the combined signal, the maximum timing being a timing at which the combined signal is maximized after the detection start timing, the detection signal indicating the detected maximum timing as a time when the combined signal is maximized; and measuring a count period in response to detecting the maximum timing, based on the detection signal, the count period being defined from the detection start timing to the detected timing as the time when the combined signal is maximized.

\* \* \* \* \*